(12) United States Patent
Porte et al.

(10) Patent No.: US 11,649,062 B2
(45) Date of Patent: May 16, 2023

(54) FORWARD PART OF AN AIRCRAFT PROPULSION UNIT NACELLE COMPRISING A MAIN PROPAGATION PATH FOR FORCES BETWEEN AN AIR INTAKE LIP AND A BACK SKIN OF AN ACOUSTIC PANEL

(71) Applicant: Airbus Operations SAS, Toulouse (FR)

(72) Inventors: Alain Porte, Colomiers (FR); Jacques Lalane, Saint Orens de Gameville (FR); Julien Sentier, Colomiers (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 722 days.

(21) Appl. No.: 16/654,119

(22) Filed: Oct. 16, 2019

(65) Prior Publication Data
US 2020/0122851 A1 Apr. 23, 2020

(30) Foreign Application Priority Data
Oct. 18, 2018 (FR) ...................................... 1859626

(51) Int. Cl.
*B64D 33/02* (2006.01)
*B64D 29/06* (2006.01)

(52) U.S. Cl.
CPC .............. *B64D 33/02* (2013.01); *B64D 29/06* (2013.01); *B64D 2033/0206* (2013.01)

(58) Field of Classification Search
CPC ............ B64D 2033/0206; B64D 33/02; B64D 29/06; B64D 2033/0286; F02C 7/045
See application file for complete search history.

(56) References Cited

U.S. PATENT DOCUMENTS

| 5,160,248 A | * | 11/1992 | Clarke | .................. | F01D 21/045 |
| | | | | | 428/117 |
| 5,941,061 A | * | 8/1999 | Sherry | .................... | B64D 29/08 |
| | | | | | 244/54 |
| 6,328,258 B1 | * | 12/2001 | Porte | ....................... | F02C 7/045 |
| | | | | | 244/62 |

(Continued)

FOREIGN PATENT DOCUMENTS

| EP | 1013910 A1 | 6/2000 |
| EP | 2241504 A2 | 10/2010 |

(Continued)

OTHER PUBLICATIONS

French Search Report; priority document.

*Primary Examiner* — Craig Kim
(74) *Attorney, Agent, or Firm* — Greer, Burns & Crain, Ltd.

(57) ABSTRACT

A forward part of an aircraft propulsion unit nacelle, comprising an air intake lip, an acoustic panel, and a rigid connection between the acoustic panel and the air intake lip. The acoustic panel has a resistive surface and a back skin, and the rigid connection is formed between the air intake lip and the back skin of the acoustic panel to form a propagation path for forces between the air intake lip and the back skin. This configuration gives freedom from design constraints, which enables an increase in the acoustic treatment region toward the front of the nacelle. An aircraft propulsion unit comprising a nacelle having such a forward part is also provided.

11 Claims, 6 Drawing Sheets

(56) References Cited

U.S. PATENT DOCUMENTS

| | | | |
|---|---|---|---|
| 6,848,656 B2* | 2/2005 | Linton | B64D 33/02 60/39.093 |
| 9,352,844 B2* | 5/2016 | Porte | B64D 33/02 |
| 9,604,438 B2* | 3/2017 | Lumbab | F01D 25/24 |
| 11,316,900 B1* | 4/2022 | Schottland | H04L 63/1416 |
| 2008/0179448 A1* | 7/2008 | Layland | H05B 3/28 244/1 N |
| 2009/0324390 A1* | 12/2009 | Harper | F02C 7/045 415/200 |
| 2010/0199629 A1* | 8/2010 | Chene | F02C 7/045 60/39.093 |
| 2011/0197973 A1* | 8/2011 | Binks | B64D 29/08 137/15.1 |
| 2012/0241249 A1* | 9/2012 | Porte | B64D 33/02 181/214 |
| 2013/0098471 A1* | 4/2013 | Porte | B64D 33/02 137/15.1 |
| 2013/0224000 A1* | 8/2013 | Porte | B64D 15/04 415/182.1 |
| 2014/0001284 A1* | 1/2014 | Porte | B64D 33/02 239/265.11 |
| 2014/0064927 A1* | 3/2014 | Binks | B64D 29/06 137/15.1 |
| 2015/0315972 A1* | 11/2015 | Lumbab | B32B 37/12 181/290 |
| 2021/0324624 A1* | 10/2021 | Ahmadi | E04B 9/34 |
| 2022/0099023 A1* | 3/2022 | Pascal | F02C 7/045 |

FOREIGN PATENT DOCUMENTS

| | | | |
|---|---|---|---|
| EP | 3964440 A1 * | 3/2022 | B64D 27/00 |
| FR | 2954281 A1 | 6/2011 | |
| FR | 2960856 A1 * | 12/2011 | B64D 33/02 |

* cited by examiner

Fig.1a

Prior Art

Fig. 1b

Prior Art

Fig.2

Prior Art

FORWARD PART OF AN AIRCRAFT PROPULSION UNIT NACELLE COMPRISING A MAIN PROPAGATION PATH FOR FORCES BETWEEN AN AIR INTAKE LIP AND A BACK SKIN OF AN ACOUSTIC PANEL

CROSS-REFERENCES TO RELATED APPLICATIONS

This application claims the benefit of the French patent application No. 1859626 filed on Oct. 18, 2018, the entire disclosures of which are incorporated herein by way of reference.

FIELD OF THE INVENTION

The present invention relates to aircraft propulsion systems and more particularly to the nacelles of aircraft propulsion systems.

BACKGROUND OF THE INVENTION

Figure 1A:
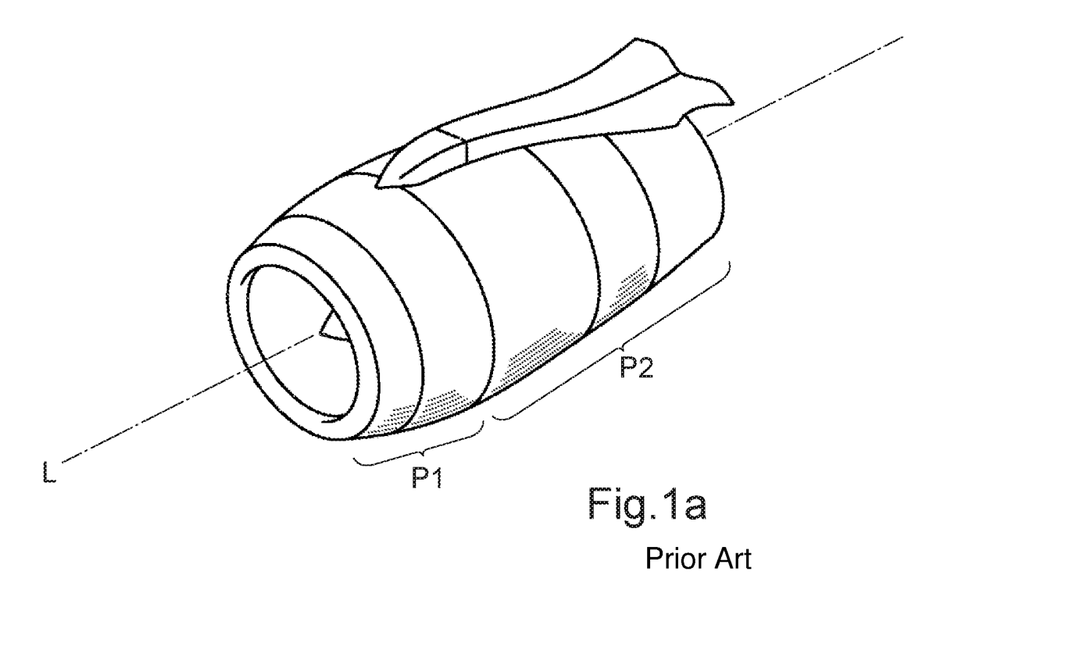
FIG. 1a is a three-dimensional schematic view of an aircraft propulsion system.

A propulsion system is a device capable of generating thrust, which constitutes the motive force of the aircraft equipped with the propulsion system. An aircraft propulsion system is depicted by way of example in FIG. 1a.

Figure 1B:
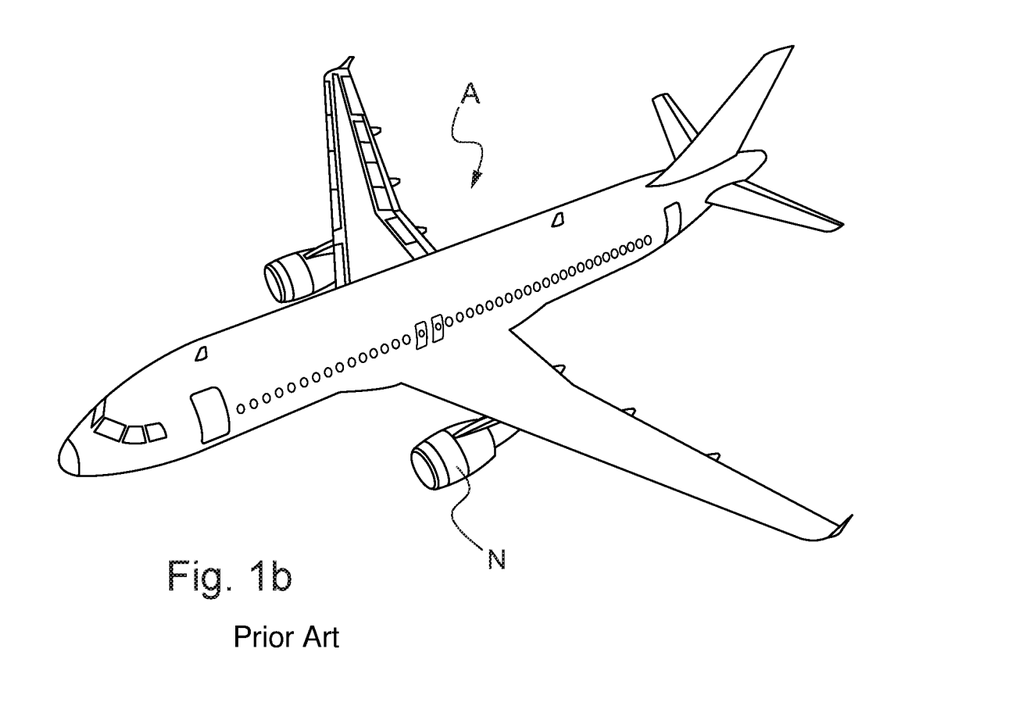
FIG. 1b is a three-dimensional schematic view of an aircraft.

One example of a conventional installation of nacelle N of a propulsion system on an aircraft A is depicted in FIG. 1b.

The nacelle in the conventional way comprises a forward part P1 forming an air intake. The forward part P1 has the role of capturing air to ensure a uniform flow toward the fan. The nacelle further comprises a main part P2, which constitutes the rest of the nacelle.

The propulsion system extends about an axis referred to hereinafter as the longitudinal axis L.

A conventional structure for the nacelle forward part P1 of an aircraft propulsion system, as known from the prior art, is described with reference to FIG. 2.

The forward part P1 of the nacelle comprises an air intake lip 1 which may be annular or substantially annular and which is positioned at the front end thereof.

Throughout the present document, the concepts of "front" and "back," of "forward" and "rear," and of "upstream" and "downstream" are to be understood with reference to the direction of the flow of air through the propulsion system. Thus, air enters the propulsion system from the front, namely via the forward part P1 of the nacelle, and re-emerges (after some of the air has been used as oxidant) via the back of the propulsion system, namely via the rear end of the main part P2.

Figure 2:
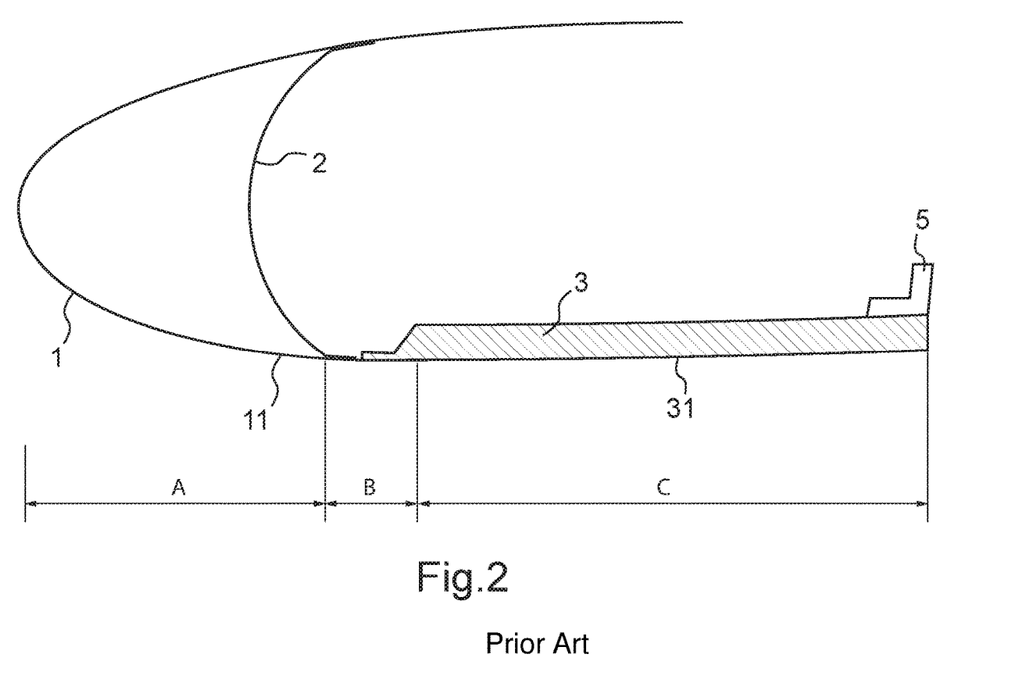
FIG. 2 is a sectioned partial diagrammatic view of a forward part of a nacelle of an aircraft propulsion system according to the prior art.

FIG. 2 depicts a forward part P1 of a propulsion system according to a conventional configuration, according to the prior art. In this configuration, the air intake lip comprises a front frame 2 which is positioned at the back of the air intake lip 1. An internal structure comprising an acoustic panel 3 extends the interior surface 11 of the air intake lip 1 backward. The acoustic panel 3 has the function of limiting the emissions of noise by the propulsion unit by absorbing soundwaves generated by the engine and the fan, in particular. The soundwaves which impact on the, generally perforated, resistive surface 31 (facing the nacelle) of the acoustic panel are absorbed over a range of frequencies that is dependent on the makeup of the acoustic panel 3. The acoustic panel also has a structural function, of transmitting mechanical forces, as explained hereinafter.

The way in which the connection between the air intake lip 1 and the acoustic panel 3 is achieved is governed by numerous design constraints. In particular, this connection needs to allow a transmission of forces between the air intake lip and the acoustic panel 3 so that, ultimately, these forces are transmitted to a connecting flange 5 that provides the connection between the forward part P1 of the nacelle and a structural element of the main part P2 of the nacelle. Furthermore, the air intake lip generally comprises thermal devices that allow deicing thereof. These devices, for example, comprise diverting hot gases coming from the engine that the nacelle contains toward the inside of the air intake lip 1. The transmission of heat to the acoustic panel 3, which occurs essentially by radiation, needs to be limited as far as possible. Finally, it is important to guarantee good surface continuity between the interior surface 11 of the air intake lip 1 and the resistive surface 31 of the acoustic panel 3.

Figure 3:
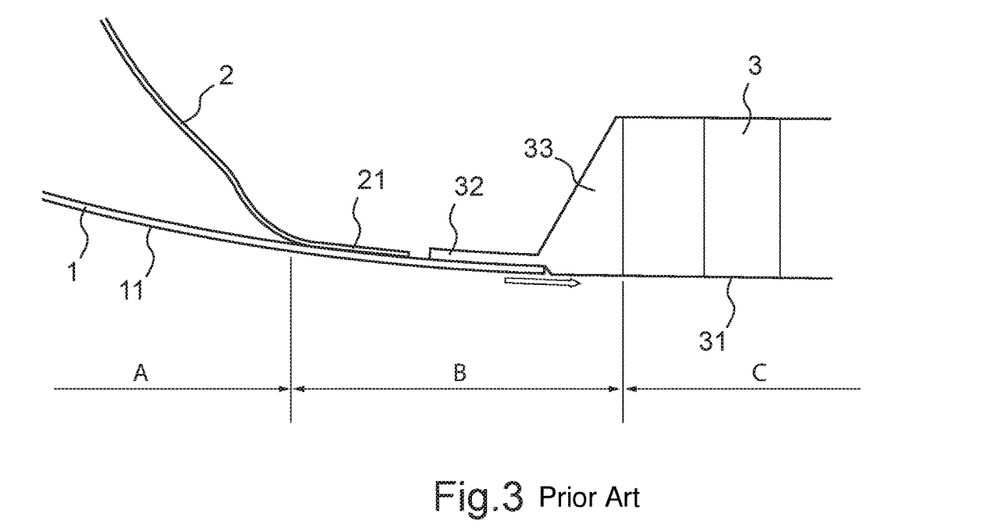
FIG. 3 is a schematic view, in longitudinal section, of the join, as achieved in the prior art, between an air intake and an acoustic panel in a forward part of a nacelle of an aircraft propulsion system.

The result of these design constraints is that the join between the air intake lip 1 and the acoustic panel 3 is achieved, for example, as depicted in detail in FIG. 3. In this configuration of join, the front frame 2 is connected to the internal wall of the air intake lip 1 (which forms the interior surface 11) at a region of contact situated in the vicinity of a foot 21 of the front frame 2. The acoustic panel 3 for its part is connected to the internal wall of the air intake lip to the back of the foot 21 of the front frame 2. In particular, the acoustic panel 3 is connected to the internal wall of the intake lip 1 at a region of contact situated to the back of the region of contact between the foot 21 of the front frame 2 and the air intake lip 1.

In order to ensure surface continuity between the interior surface 11 of the air intake lip 1 and the resistive surface 31 of the acoustic panel 3, the connection between the air intake lip 1 and the acoustic panel 3 is afforded by splicing a front ring 32 of the acoustic panel to the internal wall of the air intake lip. The method by which the acoustic panel 3 is manufactured (notably for applying the back skin to the panel), the geometric configuration of the system, and, to a lesser extent, the need to distribute the mechanical forces through the acoustic panel 3, mean that the acoustic panel 3 has a solid front region 33, which is advantageously triangular in longitudinal section.

In the prior art, the mechanical forces coming from the air intake lip 1 are thus chiefly transmitted to the acoustic panel 3 at the interior surface 11 of the air intake lip 1 toward the resistive surface 31 of the acoustic panel 3. The main path for the transmission of the forces is indicated in FIG. 3, by way of illustration, by a broad arrow.

The result of this configuration of join, and more generally of all the configurations known from the prior art, is that the acoustic treatment inside the nacelle stops, in the longitudinal direction, at the solid front region 33, which has no acoustic property. This leads to there being three regions at the front of the nacelle:

a deicing region A in front of the foot 21 of the front frame 2, in which region deicing is provided, a joining region B, which has no acoustic property or deicing function, and which, in the example depicted, comprises the region of contact between the foot 21 of the front frame 2 and the air intake lip 1, the front ring 32 of the acoustic panel with the internal wall of the air intake lip, and the solid front region 33 of the acoustic panel 3, and an acoustic treatment region C corresponding to the resistive surface 31 of the acoustic panel 3.

SUMMARY OF THE INVENTION

An objective of the invention is to extend the acoustic treatment region C as far as possible toward the front of the nacelle, particularly by limiting the length of the joining region B.

Thus, the invention relates to a forward part of an aircraft propulsion unit nacelle, comprising an air intake lip positioned at a front end of the forward part, an acoustic panel, and a rigid connection between the acoustic panel and the air intake lip. The nacelle forward part is configured in such a way that a resistive surface of the acoustic panel extends an interior surface of the air intake lip. The acoustic panel has a thickness delimited between its resistive surface and a back skin, and the connection is formed between the air intake lip and the back skin of the acoustic panel in such a way as to form a main propagation path for forces between the air intake lip and the back skin.

By creating a favored path for forces between the air intake lip and the back skin of the acoustic panel, the invention makes it possible to change the configuration of the connection between these elements, thereby eliminating certain design constraints, particularly in the front part of the acoustic panel. This ultimately allows the adoption of an acoustic panel that has acoustic properties as far as its front end, which can be closer to the front frame of the air intake lip, or even connected to the front frame.

According to one embodiment, the rigid connection between the acoustic panel and the air intake lip comprises an intermediate component the cross section of which has a first branch for connection to the air intake lip, a second branch for connection to the back skin of the acoustic panel, and a third branch rigidly connecting the first branch to the second branch. The intermediate component may be an annular component, formed as a single piece or as an assembly of several portions. The intermediate component may comprise stiffening ribs. The intermediate component may have an additional thickness inserted between a back edge of the air intake lip and a front end of the resistive surface of the acoustic panel.

According to another embodiment, the air intake lip comprises a back end comprising an extension wall extending the interior surface in the direction of the back skin. The extension wall extending the interior surface may be extended by an annular surface connected to the back skin of the acoustic panel so as to form the rigid connection between the air intake lip and the back skin. Alternatively, the extension wall extending the interior surface may be fixed to a front wall of the acoustic panel, the front wall being configured to be in contact with the back skin of the acoustic panel and fixed to the back skin, so that the rigid connection between the air intake lip and the back skin comprises the front wall.

The air intake lip may comprise a front frame comprising a foot connected to an internal surface of the air intake lip in the immediate vicinity of a front end of the acoustic panel.

The invention also relates to an aircraft propulsion unit comprising a nacelle comprising a front part and a main part, the front part being as described hereinabove. The invention finally relates to an aircraft comprising such a propulsion unit.

Other specific features and advantages of the invention will become further apparent from the description hereinafter.

BRIEF DESCRIPTION OF THE DRAWINGS

In the attached drawings, given by way of nonlimiting examples.

DETAILED DESCRIPTION OF THE PREFERRED EMBODIMENTS

FIGS. 1a to 3, which respectively show general features of aircraft propulsion systems and a configuration of a forward part of a nacelle according to the prior art, have been described hereinabove as part of the preamble of the present document.

Figure 4:
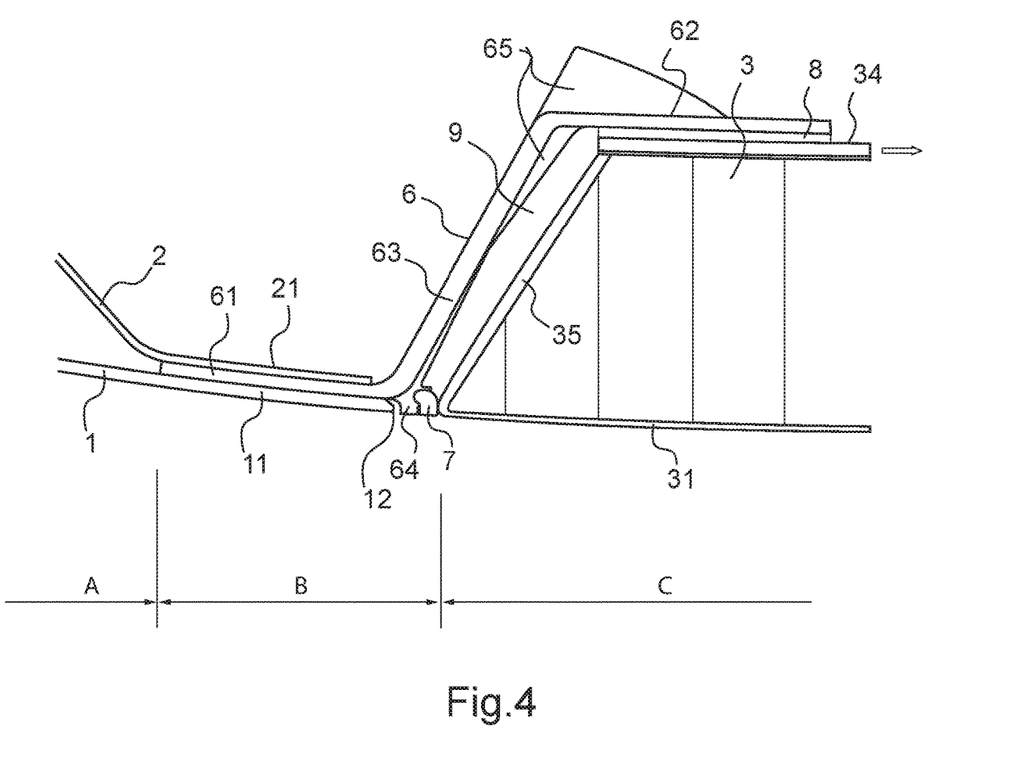
FIG. 4 depicts, in a view similar to that of FIG. 3, the join between an air intake and an acoustic panel according to one embodiment of the invention.

FIG. 4 depicts details of the join between an intake lip 1, particularly in the region of its interior surface 11, and an acoustic panel 3, according to one embodiment of the invention. Just as in the prior art, the resistive surface 31 of the acoustic panel 3 needs to be in the extension of the interior surface 11, and a rigid connection needs to be formed between the air intake lip 1 and the acoustic panel 3, so as to transmit the forces coming from the air intake lip 1 to a connecting flange 5 (not depicted in FIG. 4) used to join the nacelle forward part P1 to a main part P2.

The connection between the air intake lip 1 and the acoustic panel 3 is achieved in the embodiment depicted using an intermediate component 6. The intermediate component 6 is a rigid component connected on the one hand to the air intake lip 1 at its wall that forms the interior surface 11 and, on the other hand, to the back skin 34 of the acoustic panel 3. In particular, the intermediate component 6, when viewed in section in a plane passing through the longitudinal axis L of the nacelle, comprises a first branch 61 which is connected to the air intake lip 1. The intermediate component 6 comprises a second branch 62 which is connected to the back skin 34 of the acoustic panel 3. Finally, the intermediate component 6 comprises a third branch 63 which rigidly connects the first branch 61 to the second branch 62.

The first branch 61 provides area contact between the intermediate component 6 and the air intake lip 1. The second branch 62 provides area contact between the intermediate component 6 and the back skin 34.

Although the term used here is "branches" viewed in section, the various branches of the intermediate component in fact correspond to rings, in so far as the intermediate component is generally annular, according to the three-dimensional geometry of the nacelle forward part. Thus, the intermediate component may be produced as a single piece or by assembling, notably splicing together, several portions. In order to form an annular component, the portions may, for example, be substantially in the shape of arcs of a circle (of fixed or variable curvature).

The intermediate component 6 may have ribs 65, in order to improve its stiffness and its strength. In the case of an annular intermediate component 6, the ribs 65 are distributed, preferably uniformly, at the periphery of the intermediate component 6.

In the example depicted here, the connection between the intermediate component 6 and the air intake lip 1 is a direct connection, and can be achieved using various known means, for example riveting, screw-fastening or adhesive bonding.

The connection between the intermediate component 6 and the back skin 34 involves a fit-adjusting element 8 that allows mechanical adjustment between the intermediate component 6 and the back skin 34. For example, the fit-adjusting element 8 may be formed of a ring made of a composite material.

The connection between the intermediate component 6 and the back skin 34 may be achieved by various known means, for example by riveting, screw-fastening or adhesive bonding, and, in particular, using blind rivets.

In order to ensure surface continuity between the interior surface 11 of the air intake lip 1 and the resistive surface 31, the intermediate component in the example depicted has an additional thickness 64 inserted between a back edge 12 of the air intake lip 1 and a front end of the resistive surface 31 of the acoustic panel 3. The additional thickness 64 is configured to make up the level between the first branch 61 and ensure continuity between the interior surface 11 and the resistive surface 31. A gasket 7 may be interposed between the additional thickness 64 and the acoustic panel 3, to ensure fluidtightness, notably airtightness.

The connection thus implemented creates a main path for the transmission of forces between the air intake lip 1 and the acoustic panel 3 in the region of the back skin thereof. This main force-transmission path is depicted in FIG. 4, by way of illustration, by a broad arrow.

Figure 5:
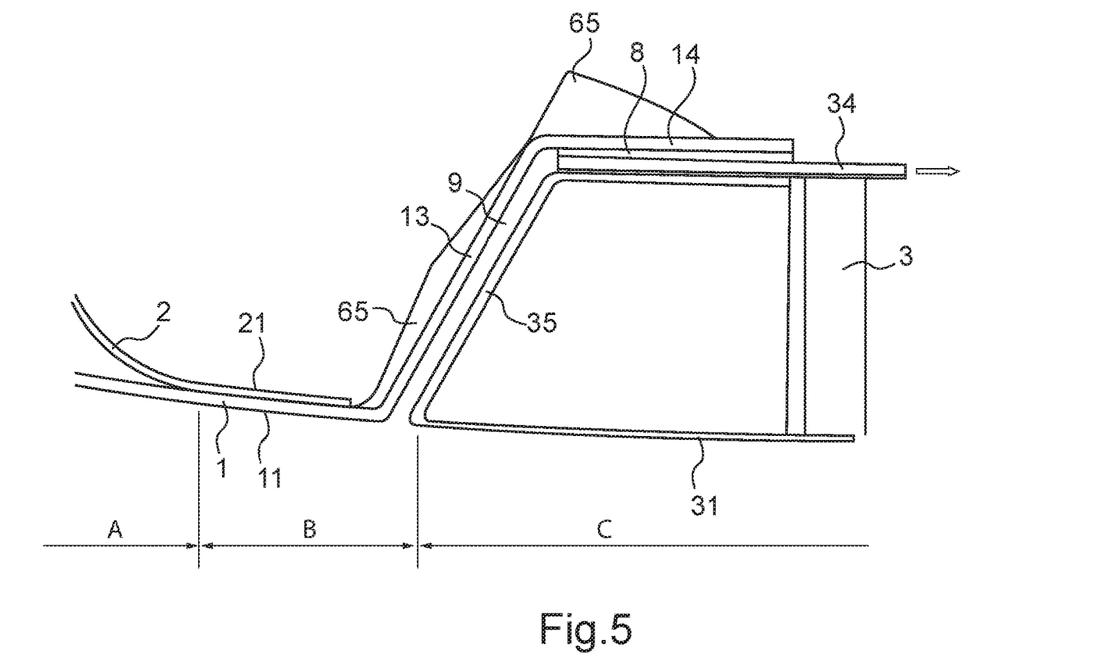
FIG. 5 depicts, in a view similar to that of FIGS. 3 and 4, the join between an air intake lip and an acoustic panel according to a second embodiment of the invention.
Figure 6:
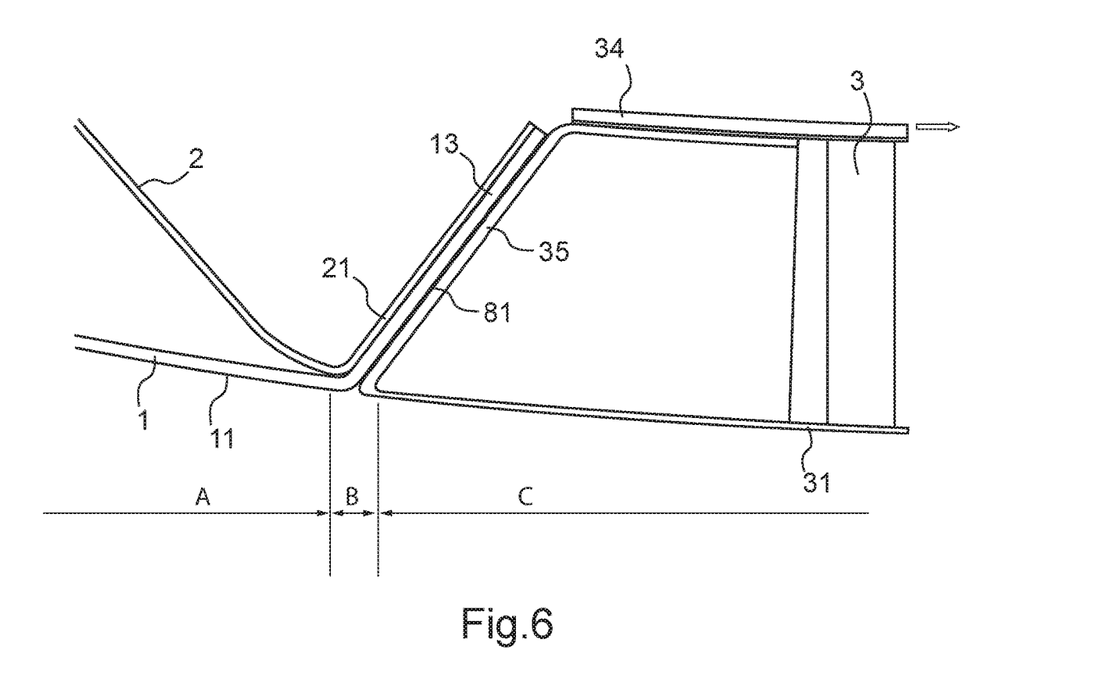
FIG. 6 depicts, in a view similar to that of FIGS. 3 to 5, the join between an air intake lip and an acoustic panel according to a third embodiment of the invention.

The connection thus employed between the air intake lip 1 and the acoustic panel 3 in the region of the back skin 34 thereof makes it possible to employ an acoustic panel that has acoustic properties (of absorbing soundwaves) all the way up to its front end which is formed by a front wall 35. Specifically, the solid front region of the acoustic panel is no longer needed, on the one hand, because the back skin 34 does not need to be applied to the front region, which in longitudinal section is triangular, of the acoustic panel 3, and, on the other hand, because the forces experienced by the air intake lip are transmitted predominantly to the back skin 34. Thus, instead of having a front region that is solid as in the prior art, that performs no acoustic function, the acoustic panel 3 may in its front region have a hollow or cellular form, or any other configuration that allows the absorption of soundwaves. For example, FIG. 4 shows a cellular structure continuing all the way to the front edge of the acoustic panel, whereas FIGS. 5 and 6 depict a hollow structure at the front end of the acoustic panel. The ways of ensuring that the acoustic panel maintains acoustic properties all the way to its front edge are interchangeable between the various embodiments of the invention.

In particular, the resistive surface 31 of the acoustic panel 3 may be perforated all the way to the front end of the acoustic panel 3. That allows the acoustic treatment region C to extend toward the front of the nacelle. The length (in the longitudinal direction of the nacelle) of the joining region B is correspondingly reduced.

In the exemplary embodiment depicted in FIG. 4, the air intake lip of the nacelle forward part comprises a front frame 2. The front frame 2 comprises a foot 21 which may thus be connected to the air intake lip 1 in the immediate vicinity of the front end of the acoustic panel. For that, in the embodiment of FIG. 4, the foot 21 of the front frame 2 is connected to the first branch 61 of the intermediate component 6, the first branch 61 itself being connected to the air intake lip 1.

The intermediate component 6, aside from its function of mechanical connection in order to create a main path for the transmission of forces to the back skin 34, may have a function of providing thermal insulation between the air intake lip and the acoustic panel. Specifically, the deicing function afforded in the air intake lip, particularly upstream of the front frame 2, may involve circulating air at around 200° C. in the air intake lip. It is preferable to limit the transmission of heat at the back of the air intake lip 1, notably toward the acoustic panel 3. Thus, the intermediate component may be made of a thermally insulating material or have a thermally insulating surface coating. Furthermore, since a large proportion of the transmission of heat occurs by radiation, an air gap 9 created between the intermediate component 6 (in this instance the third branch 63 of the intermediate component) and the front wall 35 makes it possible to limit this transmission of heat. The air gap 9 may be replaced by a gap filled with some other gas or by a vacuum gap, in order to maximize its thermal insulation function.

FIG. 5 illustrates a second embodiment of a nacelle forward part according to the invention. FIG. 5 more particularly, like FIG. 4, depicts the join between the air intake lip 1 and the acoustic panel 3 of the nacelle forward part.

This second embodiment differs from that depicted in FIG. 4 essentially in that it comprises no intermediate component 6. For the other elements, reference may therefore be made to the description given hereinabove for the embodiment of FIG. 4.

Nevertheless, in the embodiment of FIG. 5, just as in that of FIG. 6 described hereinafter, the front wall 35 is configured, and particularly curved, in such a way as to be in contact with and fixed to the back skin 34 in this contact region. Furthermore, the air intake lip 1 comprises a back end comprising an extension wall 13 extending the interior surface 11 toward the back skin 34 of the acoustic panel 3.

In the embodiment of FIG. 5, the extension wall 13 extends substantially parallel to the front wall 35 of the acoustic panel. In this second embodiment, the extension wall 13 is continued in order to further form an annular surface 14 which is superposed with and connected to the back skin 34 (directly or with a fit-adjusting element 8 as described hereinabove).

Thus, in comparison with the embodiment of FIG. 4, the function of the second branch and of the third branch of the intermediate component are performed here by the extension wall. In particular, the annular surface 14 functionally replaces the second branch 62. Nevertheless, just as in the embodiment of FIG. 4, the connection employed creates a main path for the transmission of forces (which path is indicated by a broad arrow) between the air intake lip 1 and the acoustic panel 3 in the region of the back skin 34 thereof.

A space or air gap 9 may be created between the extension wall 13 and the front wall 35 of the acoustic panel 3. That improves the thermal insulation between the air intake lip 1 and the acoustic panel 3. Quite obviously, a gasket 7 (not depicted in FIG. 5) may be interposed between the air intake lip 1 and the acoustic panel 3, advantageously so as to ensure continuity between the interior surface 11 and the resistive surface 31.

FIG. 6 illustrates a third embodiment of an aircraft forward part according to the invention, making it possible to create a main path for the transmission of forces (which path is indicated by a broad arrow) between the air intake lip 1 and the acoustic panel 3 in the region of the back skin 34 thereof. FIG. 6 more particularly, just like FIGS. 4 and 5, depicts the join between the air intake lip 1 and the acoustic panel 3 of the nacelle forward part.

In this third embodiment of the invention, in comparison with the second embodiment depicted in FIG. 5, the extension wall 13 of the air intake lip 1 is fixed to the front wall 35 of the acoustic panel 3. The connection between the air intake lip 1 and the back skin 34 is therefore achieved via the front wall 35 which is configured, and in particular curved, in such a way as to be in contact with and fixed to the back skin 34 in this contact region.

In this third embodiment, contact between the extension wall 13 and the front wall 35 may encourage the transmission of heat by conduction but, on the one hand, an insulating layer 81 (or an insulating coating) may be interposed, and, on the other hand, the insulation obtained may be satisfactory because most of the transmission of heat between the air intake lip 1 and the acoustic panel 3 is by radiation.

FIG. 6 depicts a configuration of the front frame 2 which is particularly advantageous in this third embodiment, but which could be implemented in all the embodiments of the invention, in order greatly to limit the length of the joining region B, and thus make it possible to maximize the acoustic treatment region C (and/or the deicing region A). In this configuration, the front frame is connected by its foot 21 to the extension wall 13 of the air intake lip 1. Thus, all the connections between the air intake lip 1 and the acoustic panel 3 are achieved at the front wall 35 of the acoustic panel, which means that no portion of the internal surface 11 of the nacelle need be used to achieve these connections.

Alternatively, the connection between the air intake lip and the acoustic panel may be performed between the front frame 2 of the air intake lip and the acoustic panel only, at the front wall 35 thereof, a portion of the front frame 2 extending to the back of its connecting foot 21 connecting it to the internal wall 11 of the nacelle.

Figure 7:
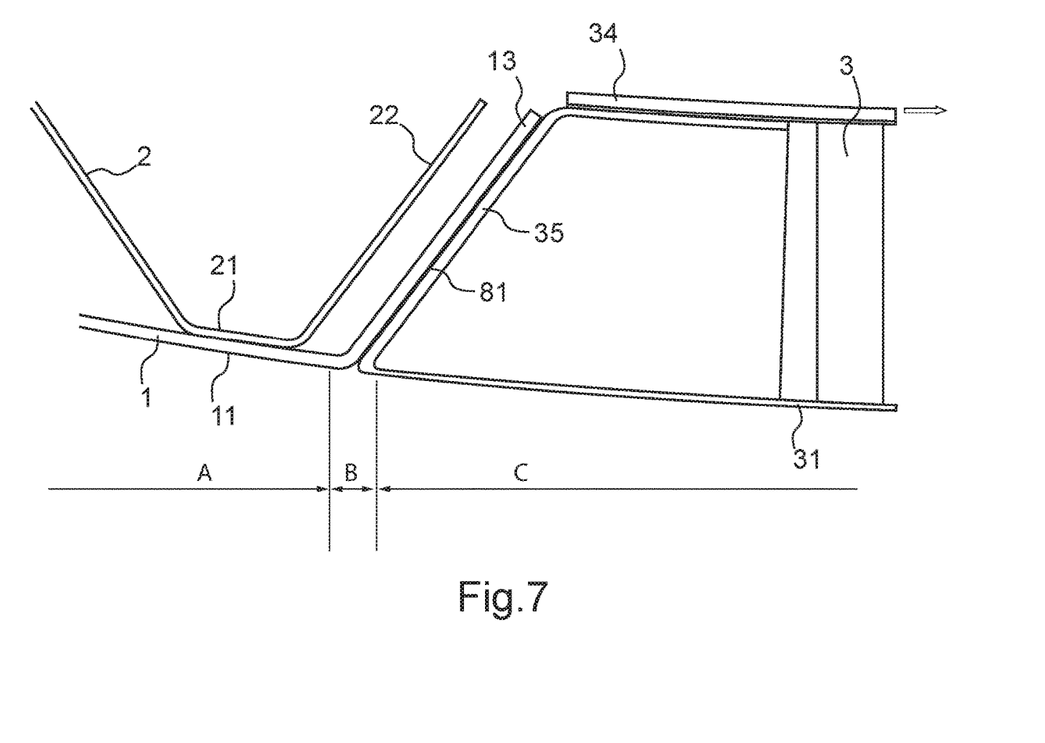
FIG. 7 depicts, in a view similar to that of FIGS. 3 to 6, the join between an air intake lip and an acoustic panel according to an alternative form of the invention.

FIG. 7 depicts an alternative form, according to the invention, of the join between an air intake 1 and an acoustic panel 3. This alternative form is illustrated on the basis of the embodiment of FIG. 6, but is applicable to all of the embodiments of the invention. In this alternative form, the foot 21 of the front frame 2 is connected to the internal wall of the air intake lip 1 and is extended by a front frame end wall 22. The front frame end wall 22 extends facing the extension wall 13, some distance therefrom. The front frame end wall 22 offers thermal protection against radiated heat at the join between the air intake 1 and the acoustic panel 3.

Alternatively, this function may be obtained by an added component attached to the air intake lip.

Figure 8:
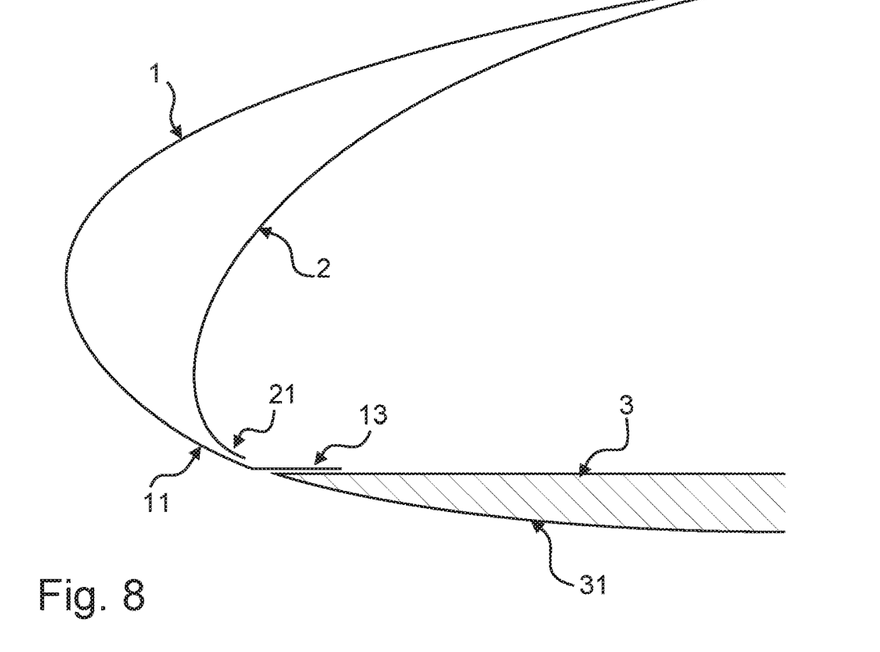
FIG. 8 is a sectioned partial diagrammatic view of a forward part of a nacelle of an aircraft propulsion system according to an alternative embodiment to those of FIGS. 4 to 7.
Figure 9:
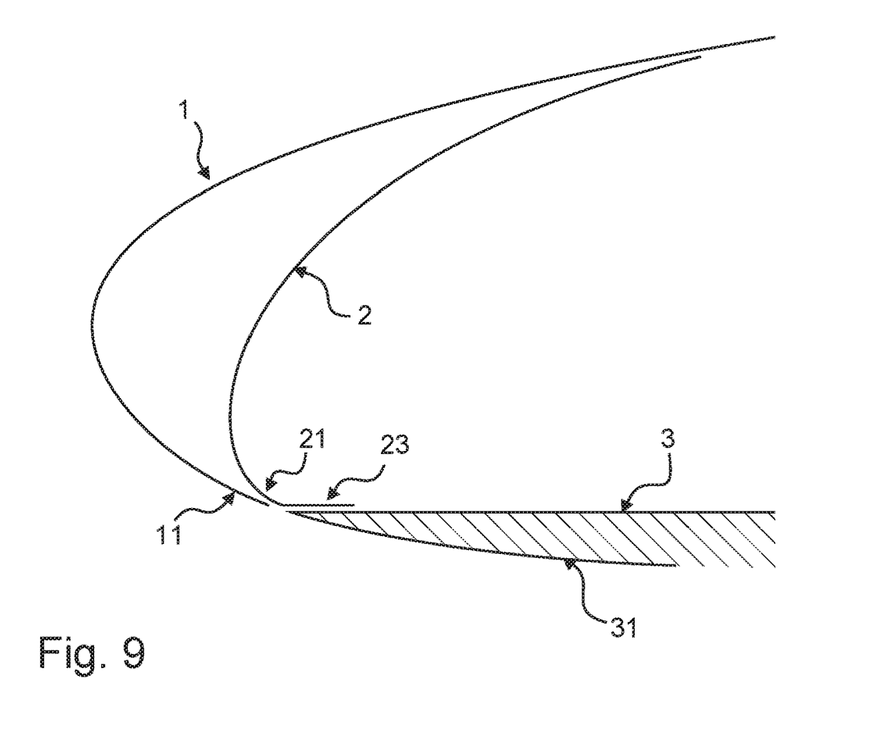
FIG. 9 depicts, in a view similar to that of FIG. 8, an alternative form of the embodiment of FIG. 8.

FIGS. 8 and 9 depict two alternative forms of one embodiment of the invention in which the acoustic panel 3 has a special configuration facilitating connection between the air intake lip and the acoustic panel, which connection is achieved at the back skin 34 of the acoustic panel 3.

In the alternative form depicted in FIG. 8, the connection between the air intake lip 1 and the back skin 34 is achieved at an extension wall 13 extending the interior surface 11 on the back skin 34.

In the alternative form depicted in FIG. 9, an extension portion 23 of the front frame 2 extends over the back skin to which it is connected, to the back of its foot 21 which is connected to the internal wall 11 of the nacelle.

In these two alternative forms, the connection may be made directly, give or take the optional presence of an interposed fit-adjusting element, or via an intermediate component that can be configured notably in order to ensure continuity between the interior surface 11 and the resistive surface 31, for example as a result of an additional thickness of the intermediate component.

The aircraft propulsion system nacelle forward part thus developed in the invention makes it possible, through an optimized configuration of the connection between the air intake lip and the acoustic panel, to maximize the acoustic treatment region inside the nacelle, by extending this region toward the front of the nacelle. The configuration proposed in the invention also makes it possible to create, at the forward end of the acoustic panel, a path for the transmission of forces toward the back skin of the acoustic panel. This is advantageous in that the forces are thus applied at least in part to a structural element situated at the same level (which means to say, at the same distance from the longitudinal axis of the nacelle) as the connecting flange that makes the join, at the level of the rear end of the acoustic panel, between the forward part of the nacelle and the main part thereof. The invention makes it possible to maintain a satisfactory level of thermal insulation between the air intake lip and the acoustic panel of the nacelle.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A forward part of an aircraft propulsion unit nacelle, comprising:
  an air intake lip positioned at a front end of said forward part,
  an acoustic panel, and
  a rigid connection between the acoustic panel and the air intake lip,
  said nacelle forward part being configured in such a way that a resistive surface of the acoustic panel extends an interior surface of the air intake lip, and
  wherein, with the acoustic panel having a thickness delimited between the resistive surface and a back skin, said rigid connection is formed between the air intake lip and said back skin of the acoustic panel in such a way as to form a main propagation path for forces between said air intake lip and said back skin, wherein the rigid connection between the acoustic panel and the air intake lip comprises an intermediate component, a cross section of which has a first branch for connection to the air intake lip, a second branch for connection to the back skin of the acoustic panel, and a third branch rigidly connecting the first branch to the second branch, wherein the intermediate component comprises stiffening ribs.

2. The nacelle forward part according to claim 1, wherein the intermediate component has an additional thickness inserted between a back edge of the air intake lip and a front end of the resistive surface of the acoustic panel.

3. The nacelle forward part according to claim 1, wherein the intermediate component is an annular component, formed as a single piece or as an assembly of several portions.

4. The nacelle forward part according to claim 1, the air intake lip of which comprises a front frame comprising a foot connected to an internal surface of the air intake lip in an immediate vicinity of a front end of the acoustic panel.

5. An aircraft propulsion unit comprising a nacelle comprising a front part and a main part, said front part being in accordance with claim 1.

6. An aircraft comprising a propulsion unit according to claim 5.

7. The nacelle forward part according to claim 1, wherein the rigid connection is formed by at least one riveting, screw-fastening, and adhesive bonding.

8. A forward part of an aircraft propulsion unit nacelle, comprising:
an air intake lip positioned at a front end of said forward part,
an acoustic panel, and
a rigid connection between the acoustic panel and the air intake lip,
said nacelle forward part being configured in such a way that a resistive surface of the acoustic panel extends an interior surface of the air intake lip, and
wherein, with the acoustic panel having a thickness delimited between the resistive surface and a back skin, said rigid connection is formed between the air intake lip and said back skin of the acoustic panel in such a way as to form a main propagation path for forces between said air intake lip and said back skin,
wherein the rigid connection between the acoustic panel and the air intake lip comprises an intermediate component, a cross section of which has a first branch for connection to the air intake lip, a second branch for connection to the back skin of the acoustic panel, and a third branch rigidly connecting the first branch to the second branch,
wherein the air intake lip comprises a back end comprising an extension wall extending the interior surface in a direction of the back skin.

9. The nacelle forward part according to claim 8, wherein said extension wall extending the interior surface is extended by an annular surface connected to the back skin of the acoustic panel so as to form the rigid connection between the air intake lip and the back skin.

10. The nacelle forward part according to claim 8, in which the extension wall extending the interior surface is fixed to a front wall of the acoustic panel, said front wall being configured to be in contact with the back skin of the acoustic panel and fixed to said back skin, so that the rigid connection between the air intake lip and the back skin comprises the front wall.

11. A forward part of an aircraft propulsion unit nacelle, comprising:
an air intake lip positioned at a front end of said forward part,
an acoustic panel, and
a rigid connection between the acoustic panel and the air intake lip,
said nacelle forward part being configured in such a way that a resistive surface of the acoustic panel extends an interior surface of the air intake lip, and
wherein, with the acoustic panel having a thickness delimited between the resistive surface and a back skin, said rigid connection is formed between the air intake lip and said back skin of the acoustic panel in such a way as to form a main propagation path for forces between said air intake lip and said back skin,
wherein the rigid connection between the acoustic panel and the air intake lip comprises an intermediate component, a cross section of which has a first branch connected to the air intake lip, a second branch connected to the back skin of the acoustic panel, and a third branch rigidly connecting the first branch to the second branch,
wherein the intermediate component has an additional thickness inserted between a back edge of the air intake lip and a front end of the resistive surface of the acoustic panel.

* * * * *